No. 752,929. PATENTED FEB. 23, 1904.
S. H. SHELLEY.
FRUIT PITTER.
APPLICATION FILED AUG. 20, 1903.
NO MODEL.

Witnesses:-
F. C. Fliedner.

Inventor,
Sivert H. Shelley
By Geo. H. Strong
Atty.

No. 752,929. Patented February 23, 1904.

UNITED STATES PATENT OFFICE.

SIVERT H. SHELLEY, OF SAN JOSE, CALIFORNIA.

FRUIT-PITTER.

SPECIFICATION forming part of Letters Patent No. 752,929, dated February 23, 1904.

Application filed August 20, 1903. Serial No. 170,118. (No model.)

*To all whom it may concern:*

Be it known that I, SIVERT H. SHELLEY, a citizen of the United States, residing at San Jose, in the county of Santa Clara and State of California, have invented new and useful Improvements in Fruit-Pitters, of which the following is a specification.

My invention relates to machines for pitting fruits, such as apricots, peaches, and the like. Its object is to provide a machine of simple construction and large capacity which will automatically cut completely around the pit to allow the pit and meat portion to be separated and which will handle the fruit without bruising it.

It consists of the parts and the construction and combination of parts as hereinafter more fully described, having reference to the accompanying drawings, in which—

Figure 1:
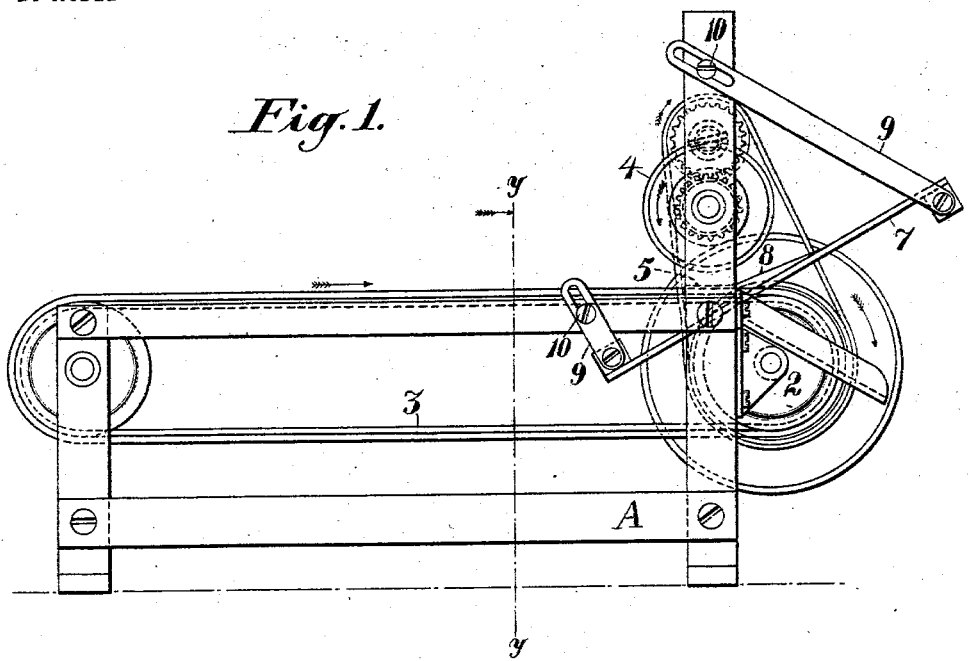
Figure 2:
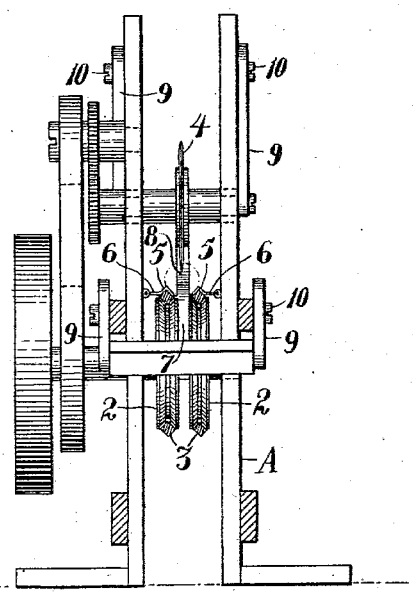
Figure 3:
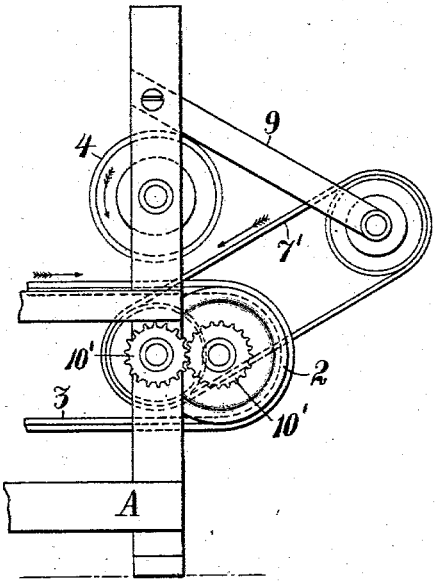

Figure 1 is a side elevation of my apparatus. Fig. 2 is a section taken on line *y y* of Fig. 1. Fig. 3 is a modification.

A represents a suitable frame in which are journaled grooved pulleys 2, arranged in pairs, around which pass the horizontal parallel carrier-belts 3. The latter are slightly separated and are preferably square in cross-section. They are adapted to be driven in unison and to carry forward the fruit, which is supported on their adjacent inclined surfaces, into engagement with the rotary cutter or knife 4. The knife is mounted upon a shaft which is journaled in bearings fixed relative to the carrier and is operated to run at a high rate of speed and to have its lower surface turn in the same direction with the adjacent plane of the carrier-belts.

Immediately beneath or opposite the knife, embracing and supported by the belts, are the thin shields 5, of metal or other suitable material, adapted to partake of the vertical movements of the belts, but preventing any lateral movement of the belts. In the present instance these stationary shields are shown as corresponding in shape to the inclines of the belts and as rigid with the hinged arms 6.

The fruit to be cut is placed on the belts and carried to the knife. When the fruit is in position so that the knife has begun to cut it, it will also have left the belts and will be resting on the shields, whereupon a rotary forward motion is given the fruit by the action of the knife, which thus cuts completely and cleanly around the fruit.

The vertical adjustment of the hinged supports or shields prevents the knife engaging the pit with any force, since the belts may give in case of any considerable pressure. It protects the belts from the knife, it prevents spreading of the belts to let the fruit drop through, and it accommodates the knife to various sizes and shapes of fruit.

Disposed in the path of the fruit behind the cutter and adjacent to the supports 5 is an inclined resilient stop or guide 7, of leather or spring metal or other suitable material, having a curved block 8, of rubber or other yielding substance, upon its surface between the belts and extending a short distance thereabove in continuation of the stationary fruit-supports 5. This guide-strap is for the purpose of continuing the rotary movement of the fruit along the edge of the knife until the fruit is completely girdled, when the two halves will drop away into suitable receivers on each side of the machine.

The ends of guide 7 are so supported that the angle of the guide or the relation of the guide to the cutter may be changed or adjusted at any time to suit fruit of different kinds or grades. I have shown the guide as attached to arms 9, which are slotted and adjustable on frame A, as at 10.

While I have described and shown but one carrier and one knife, it is obvious that the carriers and knives may be arranged in gangs, if desired, according to the needs of the operator.

In case the period of engagement of the fruit with the cutter is to be prolonged, as is desirable with large peaches and the like, I may employ an endless inclined belt 7', as in Fig. 3, operating in the plane of the opening between the belts 3 in lieu of the stationary stop 7, the belt 7' being given a reverse movement through the interengaging gears 10'. The belt 7' having a movement counter to the cutter not only retards the fruit, but assists in turning it so that it is completely encircled by the cutter.

Having thus described my invention, what I claim, and desire to secure by Letters Patent, is—

1. In a device of the character described, the combination of an endless traveling slotted carrier, a rotary cutter in the plane of the slot, and an upwardly-inclined resilient stop means at the discharge end of the carrier in the path of the fruit and capable of retarding the progress of the fruit along the carrier said carrier extending beyond the lower end of the stop means.

2. In a device of the character described, the combination of an endless traveling carrier, a rotary cutter near the discharge end thereof, and a detent inclined upwardly from a point proximate to but in advance of the discharge end of the carrier and upon which detent the fruit is given a rolling action while being operated upon by the cutter.

3. The combination of a traveling slotted carrier, a rotary cutter, and a flexible stop proximate to the cutter and inclined upwardly in the direction of travel of the carrier said stop retarding the travel of the fruit and enabling the fruit to partake of a rolling action while being acted on by the cutter.

4. The combination in a device of the character described, of a carrier, a rotary cutter, and a vertically-yielding support for the fruit intermediate of the carrier and cutter and resting upon said carrier.

5. The combination in a device of the character described, of an endless carrier comprising parallel separated belts, a cutter, and vertically-yielding shields or fruit-rests intermediate of said belts and cutter and overlying the former.

6. The combination in a device of the character described, of an endless flexible carrier comprising parallel separated belts angular in cross-section, a cutter journaled in bearings fixed relative to said belts, and pivotally-supported vertically-yielding shields intermediate of the cutter and belts, and made Λ-shaped in cross-section to correspond to the belts.

In testimony whereof I have hereunto set my hand in presence of two subscribing witnesses.

SIVERT H. SHELLEY.

Witnesses:
S. H. NOURSE,
F. C. FLIEDNER.